(12) United States Patent
Jiang et al.

(10) Patent No.: US 10,944,920 B2
(45) Date of Patent: Mar. 9, 2021

(54) VIDEO SWITCHING METHOD, DEVICE AND VIDEO PATROL SYSTEM

(71) Applicant: HANGZHOU HIKVISION SYSTEM TECHNOLOGY CO., LTD., Hangzhou (CN)

(72) Inventors: Haiyang Jiang, Hangzhou (CN); Hang Liu, Hangzhou (CN); Xiao Fan, Hangzhou (CN); Shian Wang, Hangzhou (CN)

(73) Assignee: HANGZHOU HIKVISION SYSTEM TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/342,148

(22) PCT Filed: Aug. 28, 2017

(86) PCT No.: PCT/CN2017/099329
§ 371 (c)(1),
(2) Date: Apr. 15, 2019

(87) PCT Pub. No.: WO2018/072561
PCT Pub. Date: Apr. 26, 2018

(65) Prior Publication Data
US 2019/0260945 A1    Aug. 22, 2019

(30) Foreign Application Priority Data
Oct. 18, 2016   (CN) .......................... 201610905280.X

(51) Int. Cl.
*H04N 5/268* (2006.01)
*G06F 3/14* (2006.01)
(Continued)

(52) U.S. Cl.
CPC ........... *H04N 5/268* (2013.01); *G06F 3/1446* (2013.01); *H04N 7/18* (2013.01); *H04N 21/2187* (2013.01);
(Continued)

(58) Field of Classification Search
CPC ...... H04N 5/268; H04N 7/18; H04N 21/2187; H04N 21/4312; H04N 21/4383; H04N 21/6587; G06F 3/1446
See application file for complete search history.

(56) References Cited

U.S. PATENT DOCUMENTS 7,786,877 B2   8/2010   Hou
2008/0136628 A1   6/2008   Ishii
(Continued)

FOREIGN PATENT DOCUMENTS

CN   103561239   2/2014
CN   104516760 A   4/2015
(Continued)

OTHER PUBLICATIONS

Extended European Search Report issued in Corresponding European Patent Application No. 17862921, dated Jul. 16, 2019.
(Continued)

*Primary Examiner* — Mishawn N. Hunter
(74) *Attorney, Agent, or Firm* — Norton Rose Fulbright US LLP

(57) ABSTRACT

Disclosed is a video switching method, a device, and a video patrol system. The method comprises: receiving a video switching instruction to determine a display device corresponding to a to-be-played video; determining whether there is a currently played video in the determined display device; if so, determining a task identifier corresponding to the currently played video; closing the currently played video according to the task identifier; and sending the video to be
(Continued)

played to the display device for playing. When the video played in the display device needs to be switched, the task identifier corresponding to the currently played video in the display device is determined first, and the video is closed according to the task identifier. Then, the to-be-played video is sent to the display device for playing. This shows that the currently played video is normally shutdown, thereby avoiding an unknown error caused by abnormal closing of the video.

12 Claims, 2 Drawing Sheets

(51) Int. Cl.
    *H04N 21/438*     (2011.01)
    *H04N 21/2187*     (2011.01)
    *H04N 21/431*     (2011.01)
    *H04N 21/6587*     (2011.01)
    *H04N 7/18*     (2006.01)

(52) U.S. Cl.
    CPC ..... *H04N 21/4312* (2013.01); *H04N 21/4383* (2013.01); *H04N 21/6587* (2013.01)

(56) References Cited

U.S. PATENT DOCUMENTS

| | | | |
|---|---|---|---|
| 2008/0184245 | A1 | 7/2008 | St-Jean |
| 2009/0315722 | A1 | 12/2009 | Hou |
| 2016/0266861 | A1 | 9/2016 | Kim |

FOREIGN PATENT DOCUMENTS

| | | |
|---|---|---|
| CN | 105306899 | 2/2016 |
| CN | 105872768 | 8/2016 |
| EP | 2019380 | 1/2009 |
| EP | 2555517 | 2/2013 |

OTHER PUBLICATIONS

Office Action issued in Corresponding Chinese Patent Application No. 17862921, dated Sep. 3, 2019.

International Search Report and Written Opinion issued in International Patent Application No. PCT/CN2017/099329, dated Nov. 16, 2017.

VIDEO SWITCHING METHOD, DEVICE AND VIDEO PATROL SYSTEM

CROSS-REFERENCE TO RELATED APPLICATIONS

The present application is a national phase under 35 U.S.C. § 371 of International Application No. PCT/CN2017/099329, filed Aug. 28, 2017, which claims priority to Chinese patent application No. 201610905280.X filed with the China National Intellectual Property Administration on Oct. 18, 2016 entitled "VIDEO SWITCHING METHOD, DEVICE AND VIDEO PATROL SYSTEM", each of which are incorporated herein by reference in their entirety.

TECHNICAL FIELD

The present application relates to the field of video monitoring technology, and in particular, to a video switching method, apparatus and video patrol system.

BACKGROUND

In the field of video monitoring technology, a video patrol system has been widely applied. A video patrol system usually includes capturing devices, a TV wall and other devices. In such a system, videos for different regions may be acquired by a plurality of acquiring devices and the acquired video images may be played on the TV wall in turn.

When it is shown in a certain video image that an abnormal situation (an emergency such as robbery, fire, etc.) occurs, it is necessary to stop normal playing in turn and to play the video image in which the abnormal situation is shown. Generally, it is to directly send the video image to the TV wall for playing. However, in this scheme, the playing of the video being played on the TV wall currently is abnormally stopped, which may result in some unknown errors.

SUMMARY

The embodiments of the present application aim to provide a video switching method, apparatus and video patrol system, which avoid an unknown error caused by abnormally stopping playing of the currently played video.

To achieve the above objects, an embodiment of the present application discloses a video switching method, which includes:

receiving a video switching instruction, determining an display device corresponding to a to-be-played video;

determining whether the currently played video exists in the determined display device;

if so, determining an task identifier corresponding to the currently played video;

closing the currently played video according to the task identifier;

sending the to-be-played video to the display device for playing.

Optionally, determining a display device corresponding to a to-be-played video may include:

parsing the video switching instruction so as to acquire an identifier of a display device included in the video switching instruction; and determining the display device corresponding to the acquired identifier as the display device corresponding to the to-be-played video.

Optionally, after sending the to-be-played video to the display device for playing, the method may further include:

recording a correspondence between the to-be-played video and the display device; and wherein determining whether the determined display device is currently playing a video comprises:

determining whether the determined display device is currently playing a video by searching in the recorded correspondences for a correspondence between the video and the display device, wherein existence of the correspondence between the video and the display device indicates that the determined display device is currently playing the video.

Optionally, determining a task identifier corresponding to the currently played video may include:

obtaining a correspondence between the currently played video and a thread number of a thread occupied by the currently played video;

determining a thread occupied by the currently played video according to the obtained correspondence; and wherein stopping playing of the currently played video according to the task identifier may include:

sending a release resource instruction for the determined thread, so that the thread releases resources occupied by the currently played video.

Optionally, the method may further include:

if it is determined that the determined display device currently is not playing a video, performing the step of sending the to-be-played video to the display device for playing.

Optionally, when at least two video switching instructions are received simultaneously, determining a display device corresponding to the to-be-played video may include:

determining respectively display devices corresponding to the at least two video switching instructions;

determining whether there is an identical display device corresponding to more than one display devices;

if so, determining priorities of first video switching instructions corresponding to the identical display device, and determining the identical display device as the display device corresponding to a first video switching instruction with the highest priority.

To achieve the above object, an embodiment of the present application further discloses a video switching apparatus, which includes:

a receiving determining module, configured for receiving a video switching instruction, and determining a display device corresponding to a to-be-played video;

a judging module, configured for determining whether the determined display device is currently playing a video;

a determining module, configured for determining a task identifier corresponding to the currently played video when a result of the judging module is YES;

a stopping module, configured for stopping playing of the currently played video according to the task identifier; and;

a sending module, configured for sending the to-be-played video to the display device for playing.

Optionally, the receiving determining module, is specifically configured for:

receiving the video switching instruction, parsing the video switching instruction so as to acquire an identifier of a display device included in the video switching instruction; and determining the display device corresponding to the acquired identifier as the display device corresponding to the to-be-played video.

Optionally, the apparatus may further include:

a recording module, configured for recording a correspondence between the to-be-played video and the display device; and wherein the judging module is specifically configured for determining whether the determined display device is currently playing a video by searching in the recorded correspondences for a correspondence between the video and the display device, wherein existence of the correspondence between the video and the display device indicates that the determined display device is currently playing the video.

Optionally, the determined module is specifically configured for, when a result of the judging module is yes, obtaining a correspondence between the currently played video and a thread number of a thread occupied by the currently played video, and determining a thread occupied by the currently played video according to the obtained correspondence;

wherein the stopping module is specifically configured for sending a release resource instruction for the determined thread, so that the thread releases resources occupied by the currently played video.

Optionally, the sending module is triggered in responding to a negative result from the judging module.

Optionally, the receiving determining module is specifically configured for, determining, when at least two video switching instructions are received simultaneously, respectively display devices corresponding to the at least two video switching instructions; determining whether there is an identical display device corresponding to more than one display devices; if so, determining priorities of first video switching instructions corresponding to the identical display device, and determining the identical display device as the display device corresponding to a first video switching instruction with the highest priority.

To achieve the above object, an embodiment of the present application further discloses a video patrol system, which includes: a server and an display device, wherein, the server is configured for receiving a video switching instruction, and determining a display device corresponding to a to-be-played video; determining whether the determined display device is currently playing a video; if so, determining a task identifier corresponding to the currently played video; stopping playing of the currently played video according to the task identifier; and sending the to-be-played video to the display device for playing the display device is configured for receiving and playing the video send by the server.

Optionally, the video patrol system includes at least two servers and at least two display devices.

To achieve the above object, an embodiment of the present application further discloses an electronic device, which includes: a processor, communication interface, a memory and a communication bus, wherein, the processor, the communication interface, the memory complete the communication with each other through the communication bus; the memory is used for storing computer program; the processor is configured for implementing the above video switching method when executing the program stored on the memory.

To achieve the above object, an embodiment of the present application further discloses a executable program code, which is configured for implementing the above video switching method when being executed.

To achieve the above object, an embodiment of the present application further discloses a storage medium, which is configured for storing a executable program codes, wherein, the executable program codes are configured for implementing the above video switching method when being executed.

In the embodiments of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

BRIEF DESCRIPTION OF THE DRAWINGS

In order to more clearly describe the technical solution of embodiments of the application and the prior art, drawings involved in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make objectives, technical solutions and advantages of the present application clearer, the present application now will be illustrated in detail with reference to the accompanying drawings. Obviously, the embodiments illustrated are only some of the embodiments of the present application instead of all the embodiments. All further embodiments obtained by those of ordinary skills in the art based on the embodiments herein without any creative efforts are within the scope of the present application.

Figure 1:
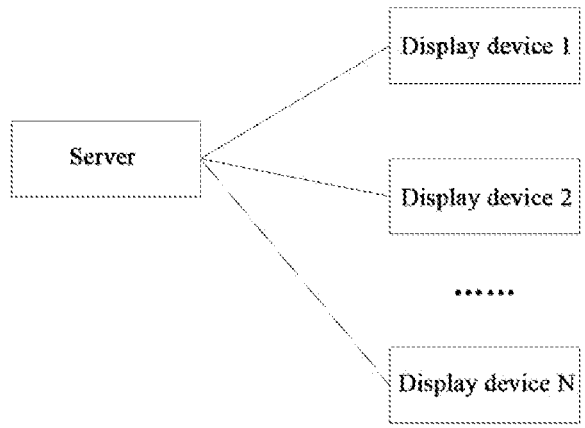
FIG. 1 is a first schematic structure diagram of a video patrol system according to an embodiment of the present application.

In order to solve the above technical problem, the embodiment of the present application provides a video switching method, which may be applicable to, but is not limited to, a server in a video patrol system. The system may, as shown in FIG. 1, includes a server and a display device (display device 1, display device 2 . . . display device N). Certainly, the system may also include an capturing device, etc., which is not limited herein. The display device may be a playing area in a TV wall. Each of the playing areas in the TV wall may be understood as a display device. The video switching method according to the embodiment of the present application will be described in detail below.

Figure 2:
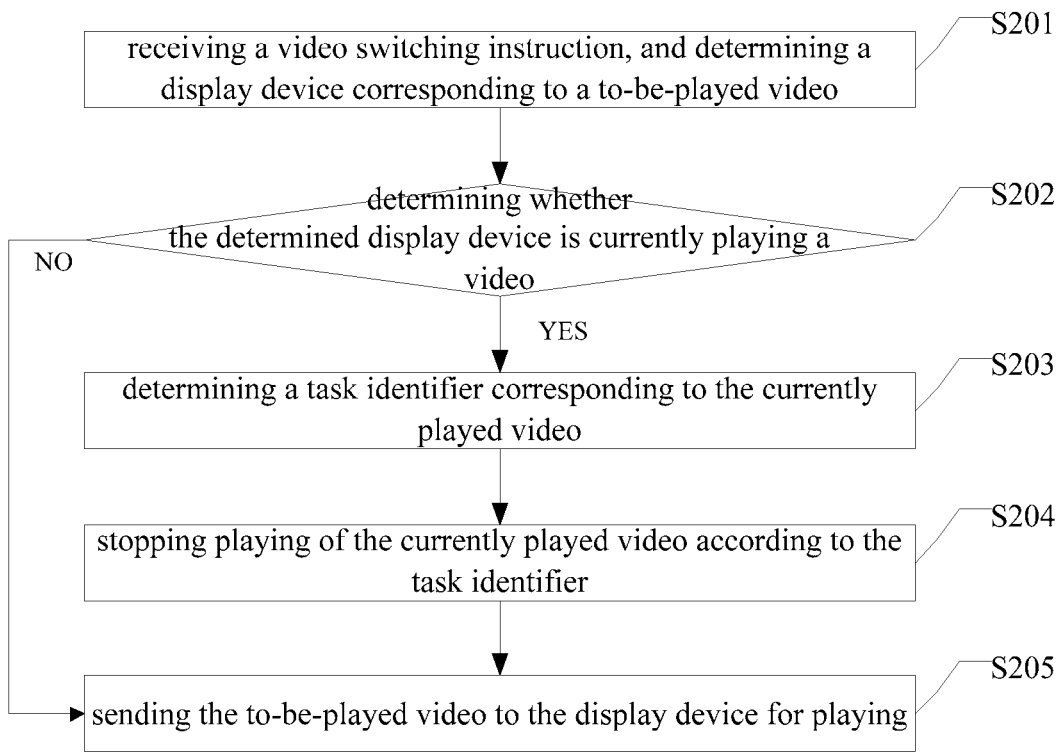
FIG. 2 is a schematic flow chart of a video switching method according to an embodiment of the present application.

FIG. 2 is a schematic flow chart of a video switching method according to an embodiment of the present application, which includes:

S201: receiving a video switching instruction, and determining a display device corresponding to a to-be-played video.

Specifically, this step may include:

parsing the video switching instruction so as to acquire an identifier of a display device included in the video switching instruction; and determining a display device corresponding to the acquired identifier as the display device corresponding to the to-be-played video.

In other word, the video switching instruction may include an identifier of a display device, and a display device corresponding to the identifier included in the instruction may be determined as the display device corresponding to the to-be-played video. Certainly, the video switching instruction may not include an identifier of a display device, and in this case, the server may allocate a corresponding display device for the to-be-played video, and feedback the identifier of the allocated display device to an user equipment that sends the video switching instruction.

The identifier of a display device may be an ID, an address, a serial number, and the like of the display device, which are not limited herein.

Furthermore, the video switching instruction may include an identifier of a capturing device corresponding to the to-be-played video, so that the server may obtain the to-be-played video from the capturing device corresponding to the identifier.

The identifier of the capturing device may be an ID, an address, a serial number, and the like of the capturing device, which is not limited herein.

S202: determining whether the determined display device is currently playing a video; if yes, performing S203, and if no, performing S205.

The server may record a correspondence between a to-be-played video and a display device after the to-be-played video is sent to the display device for playing, so that the correspondence between the video and the display device is recorded in the server. The correspondence indicates a video currently played on the display device. Therefore, it may be determined whether the display device determined in S201 is playing a corresponding video by searching in the recorded correspondences between a video and a display device, and if so, it is indicated that the determined display device is currently playing the video.

The correspondence between a video and a display device may be represented as a correspondence between an identifier of a capturing device that captures the video and an identifier of the display device, or other correspondences, which is not limited herein.

S203: determining a task identifier corresponding to the currently played video.

Specifically, this step may include:

acquiring a correspondence between the currently played video and a thread number of the thread occupied by the video;

determining a thread occupied by the currently played video according to the acquired correspondence;

S204: stopping playing of the currently played video according to the task identifier.

Specifically, this step may include:

sending a release resource instruction for the determined thread, so that the thread release the resource occupied by the currently played video.

S205: sending the to-be-played video to the display device for playing.

In other word, it is necessary to ensure that the display device currently is not playing a video before the to-be-played video is sent to the display device for playing. Therefore, it is determined first whether the display device is currently playing a video; if not, the to-be-played video is directly sent to the display device for playing, and if yes, the playing of the currently played video is stopped, and then the to-be-played video is sent to the display device for playing. In this way, an unknown error due to abnormally stopping the playing of the currently played video may be avoided.

It can be understood that the server communicatively connects with the capturing device in the system. According to the above description, the server may obtain a video in real time from the capturing device corresponding to the identifier according to the identifier of the capturing device carried in the video switching instruction, and send the obtained video to the display device for playing.

In the embodiment shown in FIG. 2 of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

In the embodiment of the present application, if at least two video switching instructions are received simultaneously, determining a display device corresponding to the to-be-played video may include:

determining, respectively, a display devices corresponding to each of the at least two video switching instructions;

determining whether there is an identical display device corresponding to more than one display devices;

if so, determining priorities of first video switching instructions corresponding to the identical display device, and determining the identical display device as the display device corresponding to a first video switching instruction with the highest priority.

For example, the server receives 3 video switching instructions (i.e., a video switching instruction 1, a video switching instruction 2, and a video switching instruction 3), and respectively determines the display devices corresponding to the 3 video switching instructions. It is assumed that, the display device corresponding to the video switching instruction 1 is the display device X, the display device corresponding to the video switching instruction 2 is also the display device X, and the display device corresponding to the video switching instruction 3 is the display device Y.

The determined display devices include an identical display device (i.e., the display device X). In this case, the priorities of each of the video switching instructions corresponding to the display device X, that is, the video switching instruction 1 and the video switching instruction 2, is determined. It is assumed that the priority of the video switching instruction 1 is higher than the priority of the video switching instruction 2, the display device X is determined as the display device corresponding to the video switching instruction 1.

That is to say, in the case that the server receives 3 video switching instructions, the server only determines the display device X as the display device corresponding to the video switching instruction 1, determines the display device Y as the display device corresponding to the video switching instruction 3, and continues the subsequent processes.

In an implementation, a priority may be preset for each capturing device, and the priority of a video switching instruction is the priority of the capturing device that captures the to-be-played video corresponding to the video switching instruction. Specifically, the priority may be set according to actual situation. Generally, the priority of the capturing device with a higher importance may be set higher.

In an implementation, after the to-be-played video is sent to the display device for playing, a recovery instruction may be received. After a recovery instruction is received, the playing of the currently played video (i.e., the to-be-played video corresponding to the video switching instruction) is stopped, and the display device is switched to continue the playing of the video being played previously.

For example, it is assumed that the display device is currently playing a video A1 captured by a capturing device A, and at this time, the server receives a video switching instruction corresponding to a to-be-played video that is a video B1 captured by a capturing device B, and the instruction carries an identifier of a display device X; in this case, the server determines a thread occupied by the video A1, and sends a release resource instruction for the thread, so that the thread releases the resource occupied by the video A1. In this way, the playing of the video A1 is stopped, and the server then sends the video B1 to the display device X, so that the display device X plays the video B1.

In playing the video B1 by the display device X, if the server receives a recovery instruction, the server determines a thread occupied by the video B1, and sends a release resource instruction for the thread, so that the thread releases the resource occupied by the video B1. In this way, the playing of the video B1 is stopped, and the server then sends the video A1 to display device X, so that the display device X continues to play the video A1.

Corresponding to the above method embodiments, an embodiment of the present application further provides a video switching apparatus.

Figure 3:
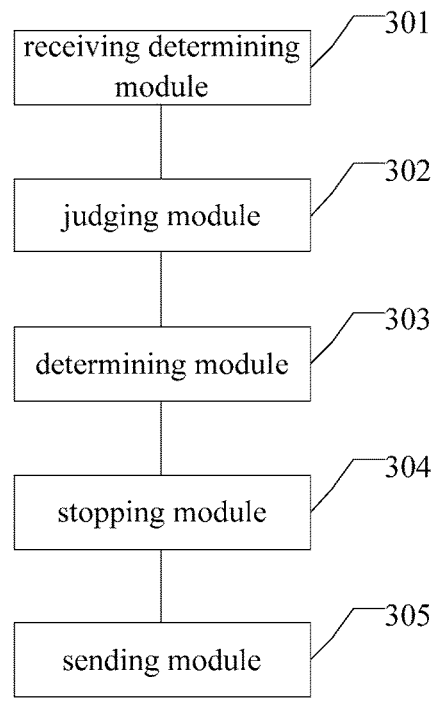
FIG. 3 is a schematic structure diagram of a video switching apparatus according to an embodiment of the present application.

FIG. 3 is a schematic structure diagram of a video switching apparatus according to an embodiment of the present application, which comprises:

a receiving determining module 301, configured for receiving a video switching instruction, and determining a display device corresponding to a to-be-played video;

a judging module 302, configured for determining whether the determined display device is currently playing a video;

a determining module 303, configured for determining a task identifier corresponding to the currently played video when a result of the judging module is YES;

a stopping module 304, configured for stopping playing of the currently played video according to the task identifier;

a sending module 305, configured for sending the to-be-played video to the display device for playing.

In an embodiment of the present application, the receiving determining module 301 is specifically configured for:

receiving the video switching instruction, parsing the video switching instruction so as to acquire an identifier of a display device included in the video switching instruction; and determining the display device corresponding to the acquired identifier as the display device corresponding to the to-be-played video.

In an embodiment of the present application, the apparatus further includes:

a recording module (not shown in the figures), configured for recording a correspondence between the to-be-played video and the display device;

wherein the judging module 302 is specifically configured for:

determining whether the determined display device is currently playing a video by searching in the recorded correspondences for a correspondence between the video and the display device, wherein existence of the correspondence between the video and the display device indicates that the determined display device is currently playing the video.

In an embodiment of the present application, the determining module 303 is specifically configured for:

when a result of the judging module is yes, obtaining a correspondence between the currently played video and a thread number of a thread occupied by the currently played video, and determining a thread occupied by the currently played video according to the obtained correspondence; and wherein the stopping module 304 is specifically configured for:

sending a release resource instruction for the determined thread, so that the thread releases resources occupied by the currently played video.

In an embodiment of the present application, the sending module 305 is triggered in responding to a negative result from the judging module 302.

In an embodiment of the present application, the receiving determining module 301 is specifically configured for:

determining, when at least two video switching instructions are received simultaneously, respectively display devices corresponding to the at least two video switching instructions;

determining whether there is an identical display device corresponding to more than one display devices;

if so, determining priorities of first video switching instructions corresponding to the identical display device, and determining the identical display device as the display device corresponding to a first video switching instruction with the highest priority.

In the embodiment shown in FIG. 3 of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

As shown in FIG. 1, the embodiment of the present application further provides a video patrol system, which includes: a server and a display device, wherein, the server is configured for receiving a video switching instruction, and determining a display device corresponding to a to-be-played video; determining whether the determined display device is currently playing a video; if so, determining a task identifier corresponding to the currently played video; stopping playing of the currently played video according to the task identifier; and sending the to-be-played video to the display device for playing;

the display device is configured for receiving and playing the video send by the server.

In an embodiment of the present application, the server may be further configured for:

parsing the video switching instruction so as to acquire an identifier of a display device included in the video switching instruction; and determining the display device corresponding to the acquired identifier as the display device corresponding to the to-be-played video.

In an embodiment of the present application, the server may be further configured for:

recording a correspondence between the to-be-played video and the display device; and wherein determining whether the determined display device is currently playing a video comprises:

determining whether the determined display device is currently playing a video by searching in the recorded correspondences for a correspondence between the video and the display device, wherein existence of the correspondence between the video and the display device indicates that the determined display device is currently playing the video.

In an embodiment of the present application, the server may be further configured for:

obtaining a correspondence between the currently played video and a thread number of a thread occupied by the currently played video;

determining a thread occupied by the currently played video according to the obtained correspondence; and wherein stopping playing of the currently played video according to the task identifier includes:

sending a release resource instruction for the determined thread, so that the thread releases resources occupied by the currently played video.

In an embodiment of the present application, the server may be further configured for:

if it is determined that the determined display device currently is not playing a video, performing the step of sending the to-be-played video to the display device for playing.

In an embodiment of the present application, when at least two video switching instructions are received simultaneously, the server may be further configured for:

determining respectively display devices corresponding to the at least two video switching instructions;

determining whether there is an identical display device corresponding to more than one display devices;

if so, determining priorities of first video switching instructions corresponding to the identical display device, and determining the identical display device as the display device corresponding to a first video switching instruction with the highest priority.

In the embodiment shown in FIG. 1 of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

In an implementation, the video patrol system comprises at least two servers and at least two display devices.

Figure 4:
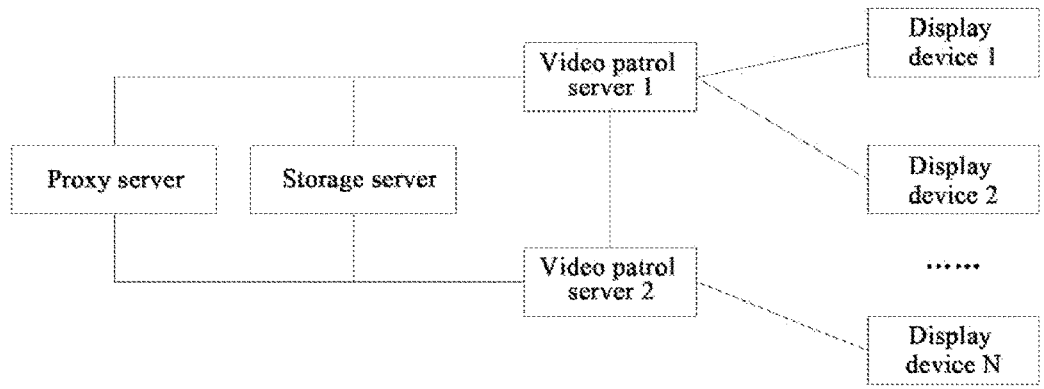
FIG. 4 is a second schematic structure diagram of a video patrol system according to an embodiment of the present application.

As shown in FIG. 4, in the embodiment of the present application, the server may be a video patrol server, including at least two video patrol servers (video patrol server 1 and video patrol server 2). The system may further include a proxy server and a storage server, wherein, the proxy server is configured to interact with the user equipment, and the storage server is configured to store the correspondence between each video patrol server and the capturing device and the display device under its management. Specifically, the proxy server may be a nginx proxy server, and the storage server may be a MemCache server, or other servers, which is not limited herein.

The video patrol system provided in the embodiment of the present application is a distributed system, in which the proxy server receives a video switching instruction and determines a video patrol server corresponding to the video switching instruction. Specifically, the video patrol server that manages the capturing device may be determined according to the identifier of the capturing device carried in the instruction; or the video patrol server that manages the display device may be determined according to the identifier of the display device carried in the instruction.

In this system, the video patrol servers commutatively connect with each other. It can be understood that, it is assumed that, after the video patrol server 1 receives a video switching instruction, the determined video device X is currently playing a video A1 captured by the capturing device A, and the thread occupied by the video A1 is allocated by the video patrol server 2, if the video patrol server 1 is to stop playing of the video A1, the video patrol server 1 needs to obtain a thread number of the thread occupied by the video A1 from the video patrol server 2. Therefore, each video patrol server needs to communicate with each other.

When a large number of video patrol servers are included in the system, a communication server (not shown in the figures) may additionally be set in the system for communication of the video patrol servers. It can be understood that, in order to implement communication among the video patrol servers, the video patrol servers should be configured based on the device information of the video patrol servers. If there are a large number of video patrol servers in the system, a large amounts of the device information is needed for configuring each of the video patrol server. In this case, a communication server may be additionally provided, in which the device information of each video patrol servers in the system may be configured. Certainly, the communication among the video patrol servers may be implemented in another way, which is not limited herein.

In an embodiment of the present application, if a proxy server receives at least two video switching instructions simultaneously, the proxy server may determine respectively display devices corresponding to the at least two video switching instructions; determining whether there is an identical display device corresponding to more than one display devices; if so, determine priorities of first video switching instructions corresponding to the identical display device, and only determine the identical display device as the display device corresponding to a first video switching instruction with the highest priority.

The server sends the instruction to the determined video patrol server. The determined video patrol server determines a display device corresponding to a to-be-played video, determines whether the determined display device is currently playing a video; if so, determines a task identifier corresponding to the currently played video; stops playing of the currently played video according to the task identifier; and sends the to-be-played video to the display device for playing.

In an embodiment of the present application, a storage server records a correspondence between the to-be-played video and the display device. The video patrol server determines whether the determined display device is currently playing a video by searching in the recorded correspondences for a correspondence between the video and the display device.

By applying the distributed system provided by the implementation of the present application, the load pressure on the devices in the system may be reduced, and thus improving the efficiency of the devices.

Figure 5:
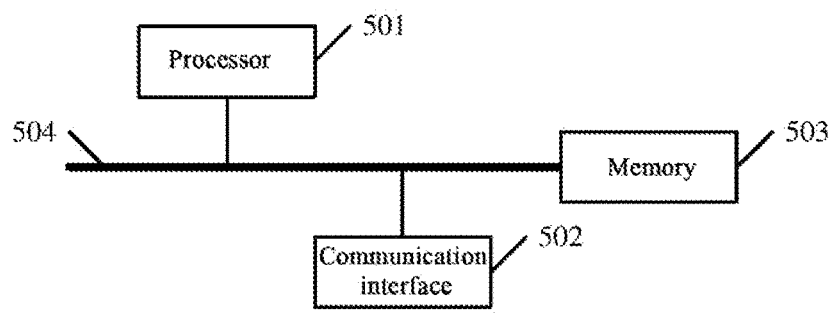
FIG. 5 is a schematic structure diagram of an electronic device according to an embodiment of the present disclosure.

The embodiment of the present application further provides an electronic device, as shown in FIG. 5, which includes a processor 501, a communication interfaces 502, a memory 503 and a communication bus 504, wherein the processor 501, the communication interfaces 502 and the memory 503 communicate with each other via the communication bus 504, the memory 503 is used for storing a computer program;

the processor 501 is configured for implementing a video switching method when executing the program stored on the memory 503. The method includes:

receiving a video switching instruction, and determining a display device corresponding to a to-be-played video;

determining whether the determined display device is currently playing a video;

if so, determining a task identifier corresponding to the currently played video;

stopping playing of the currently played video according to the task identifier; and sending the to-be-played video to the display device for playing.

The electronic device may be a server or other device, which is not limited herein.

The aforementioned communication bus in the electronic device may be a peripheral component interconnect (PCI) bus or an extended industry standard architecture (EISA) bus, etc. The communication bus can include an address bus, a data bus, a control bus, or the like. For convenience of illustration, the communication bus is represented by only one thick line in the figure, which does not mean there is only one communication bus or one type of communication bus.

The communications interface is provided for communication between the aforementioned electronic device and other devices.

The memory may include a random access memory (RAM), or may include non-volatile memory (NVM), for example at least one disk memory. Optionally, the memory may also be at least one storage device located away from the processor.

The processor described above may be a general-purpose processor, such as a central processing unit (CPU), a network processor (NP), etc.; and may also be a digital signal processor (DSP), an application specific integrated circuit (ASIC), field-programmable gate array (FPGA) or other programmable logic devices, discrete gate or transistor logic devices, discrete hardware components.

In the embodiment shown in FIG. 5 of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

The embodiment of the present application further provides a executable program code, which is configured for implementing a video switching method when being executed. The method includes:

receiving a video switching instruction, and determining a display device corresponding to a to-be-played video;

determining whether the determined display device is currently playing a video;

if so, determining a task identifier corresponding to the currently played video;

stopping playing of the currently played video according to the task identifier; and sending the to-be-played video to the display device for playing.

In the embodiment of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

The embodiment of the present application further provides a storage medium, which is configured for storing executable codes, wherein the executable program codes are configured for implementing a video switching method when being executed. The method comprising:

receiving a video switching instruction, and determining a display device corresponding to a to-be-played video;

determining whether the determined display device is currently playing a video;

if so, determining a task identifier corresponding to the currently played video;

stopping playing of the currently played video according to the task identifier; and sending the to-be-played video to the display device for playing.

In the embodiment of the present application, when the video played on the display device (TV wall) needs to be switched, the task identifier corresponding to the currently played video on the display device is determined first; the playing of the currently played video is stopped according to the task identifier; then, the to-be-played video is sent to the display device for playing. In other word, the playing of the currently played video is normally stopped, thereby avoiding an unknown error caused by abnormally stopping the displaying of the currently played video.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, for embodiments of the apparatus, embodiments of the system, embodiments of electronic device, embodiments of executable program code, embodiments of storage medium, since they are similar to the embodiments of the method, the description thereof is relatively simple, the relating parts could refer to the parts of the description of embodiments of the method.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A video switching method, comprising:
   receiving a video switching instruction, and determining a display device corresponding to a to-be-played video;
   determining whether the determined display device is currently playing a video;
   if so, determining a task identifier corresponding to the currently played video;
   stopping playing of the currently played video according to the task identifier; and
   sending the to-be-played video to the display device for playing,
   wherein determining a task identifier corresponding to the currently played video comprises: obtaining a correspondence between the currently played video and a thread number of a thread occupied by the currently played video; determining a thread occupied by the currently played video according to the obtained correspondence; and wherein stopping playing of the currently played video according to the task identifier comprises: sending a release resource instruction for the determined thread, so that the thread releases resources occupied by the currently played video; and
   wherein when at least two video switching instructions are received simultaneously, determining a display device corresponding to the to-be-played video comprises: determining respectively display devices corresponding to the at least two video switching instructions; determining whether there is an identical display device corresponding to more than one display devices; if so, determining priorities of first video switching instructions corresponding to the identical display device, and determining the identical display device as the display device corresponding to a first video switching instruction with the highest priority.

2. The method of claim 1, wherein determining a display device corresponding to a to-be-played video comprises:
   parsing the video switching instruction so as to acquire an identifier of a display device included in the video switching instruction; and
   determining the display device corresponding to the acquired identifier as the display device corresponding to the to-be-played video.

3. The method of claim 1, wherein after sending the to-be-played video to the display device for playing, the method further comprises:
   recording a correspondence between the to-be-played video and the display device; and
   wherein determining whether the determined display device is currently playing a video comprises:
   determining whether the determined display device is currently playing a video by searching in the recorded correspondences for a correspondence between the video and the display device, wherein existence of the correspondence between the video and the display device indicates that the determined display device is currently playing the video.

4. The method of claim 1, further comprising:
   if it is determined that the determined display device currently is not playing a video, performing the step of sending the to-be-played video to the display device for playing.

5. A video switching apparatus, comprising:
   a receiving determining module, configured for receiving a video switching instruction, and determining a display device corresponding to a to-be-played video;
   a judging module, configured for determining whether the determined display device is currently playing a video;
   a determining module, configured for determining a task identifier corresponding to the currently played video when a result of the judging module is YES;
   a stopping module, configured for stopping playing of the currently played video according to the task identifier; and;
   a sending module, configured for sending the to-be-played video to the display device for playing,
   wherein the determining module is further configured for: when a result of the judging module is yes, obtaining a correspondence between the currently played video and a thread number of a thread occupied by the currently played video, and determining a thread occupied by the currently played video according to the obtained correspondence; and wherein the stopping module is further configured for: sending a release resource instruction for the determined thread, so that the thread releases resources occupied by the currently played video,
   wherein the receiving determining module is further configured for: determining, when at least two video switching instructions are received simultaneously, respectively display devices corresponding to the at least two video switching instructions; determining whether there is an identical display device corresponding to more than one display devices; if so, determining priorities of first video switching instructions corresponding to the identical display device, and determining the identical display device as the display device corresponding to a first video switching instruction with the highest priority.

6. The apparatus of claim 5, wherein the receiving determining module is further configured for:
   receiving the video switching instruction, parsing the video switching instruction so as to acquire an identifier of a display device included in the video switching instruction; and determining the display device corresponding to the acquired identifier as the display device corresponding to the to-be-played video.

7. The apparatus of claim 5, further comprising:
   a recording module, configured for recording a correspondence between the to-be-played video and the display device; and
   wherein the judging module is further configured for:
   determining whether the determined display device is currently playing a video by searching in the recorded correspondences for a correspondence between the video and the display device, wherein existence of the correspondence between the video and the display device indicates that the determined display device is currently playing the video.

8. The apparatus of claim 5, wherein the sending module is triggered in responding to a negative result from the judging module.

9. A video patrol system, comprising: a server and a display device, wherein,
the server is configured for receiving a video switching instruction, and determining a display device corresponding to a to-be-played video; determining whether the determined display device is currently playing a video; if so, determining a task identifier corresponding to the currently played video; stopping playing of the currently played video according to the task identifier; and sending the to-be-played video to the display device for playing, wherein determining a task identifier corresponding to the currently played video comprises: obtaining a correspondence between the currently played video and a thread number of a thread occupied by the currently played video; determining a thread occupied by the currently played video according to the obtained correspondence; and wherein stopping playing of the currently played video according to the task identifier comprises: sending a release resource instruction for the determined thread, so that the thread releases resources occupied by the currently played video; and wherein when at least two video switching instructions are received simultaneously, determining a display device corresponding to the to-be-played video comprises: determining respectively display devices corresponding to the at least two video switching instructions; determining whether there is an identical display device corresponding to more than one display devices; if so, determining priorities of first video switching instructions corresponding to the identical display device, and determining the identical display device as the display device corresponding to a first video switching instruction with the highest priority;
the display device is configured for receiving and playing the video send by the server.

10. The system of claim 9, wherein the video patrol system comprises at least two servers and at least two display devices.

11. An electronic device, comprising: a processor, a communication interface, a memory and a communication bus, wherein the processor, the communication interface, and the memory communicate with each other via the communication bus;
the memory is used for storing a computer program;
the processor is configured for implementing the video switching method of claim 1 when executing the program stored on the memory.

12. A non-transitory storage medium, which is configured for storing executable program codes, wherein, the executable program codes are configured for implementing the video switching method of claim 1 when being executed.

* * * * *